United States Patent
Niewold et al.

(10) Patent No.: US 8,268,070 B2
(45) Date of Patent: *Sep. 18, 2012

(54) HYBRID PIGMENT COMPOSITION COMPRISING DYES OR PIGMENTS AND FIBROUS CLAY

(75) Inventors: Lori Ann Niewold, Anthony, NM (US); Robyn Torres, El Paso, TX (US); Gary E. Williams, El Paso, TX (US)

(73) Assignee: Mayan Pigments, Inc., El Paso, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/922,013

(22) PCT Filed: Mar. 10, 2009

(86) PCT No.: PCT/US2009/036680
§ 371 (c)(1),
(2), (4) Date: Jan. 31, 2011

(87) PCT Pub. No.: WO2009/114541
PCT Pub. Date: Sep. 17, 2009

(65) Prior Publication Data
US 2011/0113986 A1    May 19, 2011

Related U.S. Application Data

(60) Provisional application No. 61/112,894, filed on Nov. 10, 2008, provisional application No. 61/035,164, filed on Mar. 10, 2008.

(51) Int. Cl.
*C09C 3/08* (2006.01)
*C09C 1/00* (2006.01)
*C09C 1/42* (2006.01)
*C09B 67/00* (2006.01)
*C09B 67/02* (2006.01)

(52) U.S. Cl. ........ 106/487; 106/493; 106/494; 106/495; 106/496; 106/497; 106/498

(58) Field of Classification Search .................. 106/486, 106/487, 493, 494, 495, 496, 497, 498
See application file for complete search history.

(56) References Cited

U.S. PATENT DOCUMENTS

| 7,052,541 | B2 * | 5/2006 | Chianelli et al. ............. 106/401 |
| 2004/0011254 | A1 | 1/2004 | Chianelli et al. |
| 2007/0277702 | A1 | 12/2007 | Chianelli et al. |
| 2010/0298482 | A1 * | 11/2010 | Niewold et al. ............... 524/445 |

OTHER PUBLICATIONS

Transmittal of International Preliminary Report on Patentability issued in International Application No. PCT/US2009/036680 dated Sep. 23, 2010.

* cited by examiner

*Primary Examiner* — Anthony J Green
(74) *Attorney, Agent, or Firm* — McDermott Will & Emery LLP

(57) ABSTRACT

A hybrid pigment composition and method of forming the hybrid pigment composition is provided. The hybrid pigment composition is formed from a fibrous clay and a dye or pigment. The dye or pigment includes perinones, diphenylmethanes, acridines, xanthenes, triarylmethanes, thiazines, indophenols, indulines, nigrosines, aminoazobenzenes, anilines, monoazos, benzimidazoles, diazos, phthalocyanines, quinacridones, metal complexes, azo/metal complexes, and mixtures thereof.

20 Claims, 2 Drawing Sheets

HYBRID PIGMENT COMPOSITION COMPRISING DYES OR PIGMENTS AND FIBROUS CLAY

RELATED APPLICATIONS

This application claims the benefit of priority of U.S. Provisional Application Ser. Nos. 61/035,164, filed Mar. 10, 2008; and 61/112,894 filed Nov. 10, 2008. This application discloses subject matter similar to that disclosed in U.S. Pat. Nos. 7,052,541; 7,425,235; and 7,429,294; U.S. application Ser. No. 11/424,758, filed Jun. 16, 2006; U.S. application Ser. No. 12/068,115 filed Feb. 1, 2008; U.S. Provisional Application No. 61/021,783 filed Jan. 17, 2008; U.S. Provisional Application No. 60/990,854, filed Nov. 28, 2007; PCT/US2009/031572, filed Jan. 21, 2009; and PCT/US2008/084786, filed Nov. 26, 2008, the contents of each herein incorporated by reference in their entirety.

The government may own rights in the present invention pursuant to NSF Contract #0724210.

FIELD OF THE INVENTION

This invention relates to hybrid pigment compositions comprising dyes or pigments and clays and methods for forming the hybrid pigment compositions.

BACKGROUND

Colored minerals, earths and ochers, have been used throughout human history. Natural earth minerals lend themselves to a wide range of decorations, from body paint to painting on natural or constructed walls. The colors are extremely stable, as can be seen in ancient paintings that have lasted to this day. The use of colored earth pigments is found even in the oldest civilizations.

In the scientific literature, the term Maya blue refers to a "turquoise" brilliant shade of blue that is found on murals and archaeological artifacts, for example, throughout Mesoamerica. It is described in the literature as being composed of palygorskite clay and indigo, that when mixed and heated, produce the stable brilliant blue color similar to that found in Mesoamerica. Proposed methods of preparation were performed with the intent of trying to replicate the blue color found at the historical sites and to reproduce the techniques employed by the original Maya.

H. Van Olphen, Rutherford Gettens, Edwin Littman, Anna Shepard, and Luis Torres were involved in the examination of organic/inorganic complex paint from the 1960's to the 1980's. In early studies, Littman and Van Olphen published information specifically on the synthesis of the Mayan organic/inorganic complex (Littman, *Amer. Antiquity*, 45:87-101, 1980; Littman, *Amer. Antiquity*, 47:404-408, 1982; Olphen, *Amer. Antiquity*, 645-646, 1966; Olphen, *Science*, 154:645-646, 1966). Their work did not describe the technique for making the colorant, nor explain the stability of the organic/inorganic complex. However, the results of their two decades of studies with respect to the ancient paint laid a foundation of knowledge for future investigators.

Littman synthesized indigo-attapulgite complexes and verified that his synthetic version was indistinguishable from the original pigments found in the pre-Hispanic murals and artifacts (Littman, *Amer. Antiquity*, 45:87-101, 1980; Littman, *Amer. Antiquity*, 47:404-408, 1982). The prepared samples had the same physical and chemical characteristics as the authentic Maya blue examined. Littman concluded that the remarkable stability of the attapulgite was due to the heat treatment the attapulgite received during the synthesis. Others have also synthesized compounds similar to that of Maya blue by a number of routes (Torres, *Maya Blue: How the Mayas Could Have Made the Pigment*, Mat. Res. Soc. Symp., 1988). They employed the Gettens test to determine whether the laboratory synthesis of Maya blue was indeed authentic with the same chemical resistant properties (Gettens, *Amer. Antiquity*, 27:557-564, 1962). The test was necessary because initial attempts of simply mixing the palygorskite clay produced the color of Maya blue but the mixture did not possess the same chemical properties as the original organic/inorganic complex samples.

Previous literature discussions of pH pertain to the alkaline pH required to reduce the indigo prior to contacting it with the clay (Littman, *Amer. Antiquity*, 45:87-101, 1980; Littman, *Amer. Antiquity*, 47:404-408, 1982). Moreover, there was a lack of understanding regarding the chemistry for producing stable and nontoxic paint systems by combining dyes and pigments with fibrous clays. U.S. Pat. No. 3,950,180 describes color compositions that involve cationic organic basic colored compounds complexed to alkali-treated inorganic substances.

More recently, several patents and patent applications discussed indigo and related organic dyes complexed in an ionic interaction with inorganic supports. PCT Publication No. WO 01/04216 also describes ionic interactions in color compositions, wherein organic dyes undergo ion exchange with charged inorganic clays.

U.S. Pat. No. 3,950,180 covers a method of manufacturing color compositions that include zeolite and montmorillonite. U.S. Pat. No. 5,061,290 covers a method of using indigo derivatives as a dyeing agent. U.S. Pat. No. 4,246,036 covers the method of manufacturing color compositions that are comprised of asbestos-cement. U.S. Pat. No. 4,640,862 covers color compositions that are used for coating an expanded polystyrene "drop-out" ceiling tile. U.S. Pat. No. 4,868,018 covers color compositions that are used with a mixture of epoxy resin, epoxy resin hardener, and portland cement to form a coating which can be applied to a surface to form simulated marble products. U.S. Pat. No. 4,874,433 covers a method for encapsulating color compositions in and/or to a zeolite. U.S. Pat. No. 5,574,081 covers a method of manufacturing waterborne clay-containing emulsion paints with improved application performance using color compositions. U.S. Pat. No. 5,972,049 covers the method of manufacturing and using color compositions to form dye carriers used in the dyeing process for hydrophobic textiles. U.S. Pat. No. 5,993,920 covers the method of manufacturing and using color compositions with stone powder and/or cement powder, fine sawdust and/or the heart of a kaoliang stalk and other materials to form an incombustible artificial marble. U.S. Pat. No. 6,339,084 covers the method of manufacturing thiazine-indigo pigments. U.S. Pat. No. 6,402,826 covers the method and manufacturing of color compositions for paper coating.

U.S. Pat. Nos. 7,052,541 and 7,429,294 describe color compositions comprising neutral indigo derivative pigments and dyes complexed to the surface of inorganic clays. These materials are useful as paints and coatings for artistic and industrial purposes, including use in cements, plastics, papers and polymers. Upon grinding and heating the organic and inorganic component as solid mixtures or in aqueous solutions, the resulting color compositions have unprecedented stability relative to the original starting materials. U.S. Pat. No. 7,425,235 describes the use of similar starting materials in methods that rely on UV-light for preparing color compositions.

Solvent dyes are named "solvent" dyes because they are soluble in organic solvent such as aliphatic and aromatic hydrocarbons, waxes, and oils. Their solubility in these types of solvents makes them suitable as colorants in a wide variety of applications such as wood finishes, candles, plastics, thermo-set resins, petroleum distillates, and inks.

Different chemical classes of solvent dyes include azo, azo metal complex types, triarylmethanes, amine and basic dye complexes of acid solvent dyes, quinolines and those based upon anthraquinone chemistry. Generally solvent dyes are transparent, but depending on the specific chemical class of the solvent dye, the heat stability and light-fastness properties can vary significantly. As such, only some solvent dyes may be heat stable enough for high temperature resin or polycarbonate resin applications, for example. Depending on what material or medium is to be colored, appropriate solvent dyes are selected based on their inherent physical and chemical properties. While numerous solvent dyes are commercially available, the color choices are limited and are based on the end-use application and the subsequent required properties.

Disperse dyes are water-insoluble or have low solubility in water and may be dispersed in water as very fine particles. Disperse dyes can be used to color textiles and plastics such as polyester, cellulose acetates, synthetic fibers, polyamides, polyvinylchloride, polyurethanes, polyacryl and foam materials. In general the chemical structures of disperse dyes are small, planar, and non-ionic, with attached polar groups such as $NO_2$ and $CN^-$ functionalities that allow them to attach to a polymer or textile. Their small molecular size makes it easier for the molecules to attach or bond to the surface of the material to be colored but this small size also makes it easier for the molecules to sublime out of a substrate such as a plastic, at sufficiently high temperatures.

There are several chemical classes comprising disperse dyes including the azo class. The azo class of disperse dyes includes aminoazobenzenes, heterocyclic aminoazobenzenes, heterocyclic coupling components (often used to make yellows) and diazo disperse dyes. There are also carbonyl classes, nitro classes, and polymethine classes. Some disperse dyes are also solvent dyes or grades of these dyes that are food, drug, and cosmetics (FD&C) approved.

SUMMARY

It has been discovered that by heating a fibrous clay, such as palygorskite or sepiolite, in the presence of a solvent dye, disperse dye, or pigment, a synergistic reaction occurs that results in a hybrid new solvent dye, disperse dye, or pigment complex that exhibits superior physical and chemical properties relative to the pure solvent dye, disperse dye, or pigment alone. In fact, while heat may aid in the rate of the reaction between a solvent dye, disperse dye, or pigment and inorganic clay support, the reaction may also occur simply through blending of the organic dye or pigment and the inorganic clay. In certain embodiments of the present disclosure where a dye or pigment/clay mixture is not heat-treated a color shift still is observed, indicating hydrogen bonding alone is causing the reaction between the clay surface and the functional groups on the dye or pigment. Thus, it appears that heat treatment may not be necessary in order to synthesize novel hybrid pigments according to the present disclosure. Reacting dyes or pigments with the clay support enhances desired properties such as opacity, thermal stability, light-fastness, and also yields new, unique colors. The dyes or pigments reacted with a clay, such as palygorskite or sepiolite, result in a hybrid pigment that exhibits properties desired by those in the industry such as masterbatch or fiber producers. These dye or pigment/clay hybrid pigments may also be incorporated into a liquid medium such as a paint or coating with enhanced physical or chemical properties. The hybrid pigments may also provide new colors to these industries.

All solvent dyes have some chemical functionality that allow them to be soluble in such medium as organic solvents or oils. This same chemical functionality, such as a hydroxyl group or silanol group, allows for a reaction to occur with surface reactive chemical groups present on the fibrous clays, such as a hydroxyl group or silanol group.

Some dye classes that may react with the clay are FD&C approved and are important classes since hybrid complexes that may be commercially sold into indirect or direct food contact or cosmetic applications must contain all components approved as FDA or FD&C, respectively.

In certain embodiments of the present disclosure, a hybrid pigment composition is provided. The hybrid pigment composition comprises a dye or pigment selected from the group consisting of perinones, diphenylmethanes, acridines, xanthenes, triarylmethanes, thiazines, indophenols, indulines, nigrosines, aminoazobenzenes, anilines, monoazos, benzimidazoles, diazos, phthalocyanines, quinacridones, metal complexes, azo/metal complexes, and mixtures thereof; and a fibrous clay. In certain embodiments, the fibrous clay is selected from palygorskite, sepiolite, and mixtures thereof. In certain embodiments, the dye or pigment and fibrous clay are heated to react the dye or pigment with the fibrous clay.

In certain embodiments of the present disclosure, the dye or pigment is present in an amount of about 1 wt. % to about 90 wt. % based on the total weight of the dye or pigment and clay. In certain embodiments, the dye or pigment is present in an amount of about 10 wt. % to about 60 wt. % based on the total weight of the dye or pigment and clay. In certain embodiments, the dye or pigment is present in an amount of about 15 wt. % to about 45 wt. % based on the total weight of the dye or pigment and clay. In certain embodiments, the dye or pigment is present in an amount of 20 wt. % to about 30 wt. % based on the total weight of the dye or pigment.

In certain embodiments of the present disclosure, a hybrid pigment composition is provided comprising a dye or pigment selected from the group consisting of Solvent Orange 3, Solvent Orange 5, Solvent Orange 6, Solvent Orange 15, Solvent Orange 60, Solvent Yellow 2, Solvent Yellow 14, Solvent Yellow 21, Solvent Yellow 32, Solvent Yellow 34, Solvent Yellow 45, Solvent Yellow 114, Solvent Red 23, Solvent Red 24, Solvent Red 35, Solvent Red 41, Solvent Red 49, Solvent Red 135, Solvent Green 1, Solvent Violet 8, Solvent Blue 3, Solvent Blue 4, Solvent Blue 7, Solvent Blue 8, Solvent Blue 22, Solvent Black 5, Solvent Black 7, Solvent Brown 43, Pigment Orange 64, Pigment Red 57:1, Pigment Red 242, Pigment Yellow 138, Pigment Yellow 154, Pigment Yellow 180, Pigment Yellow 181, Pigment Yellow 191, Pigment Yellow 214, Pigment Blue 15:3, Pigment Violet 19, Disperse Red 277, D&C Yellow Y7, D&C Red 30, D&C Red 30 Talc LK, D&C Violet V2, D&C Red 36, D&C Yellow 10, Yellow LC124, Disperse Yellow 54, and mixtures thereof; and a fibrous clay. In certain embodiments, the fibrous clay is selected from palygorskite, sepiolite, and mixtures thereof. In certain embodiments, the dye or pigment and fibrous clay are heated to react the dye or pigment with the fibrous clay. The dye or pigment can be present in an amount of about 1 wt. % to about 90 wt. % based on the total weight of the dye or pigment and clay. In certain embodiments, the dye or pigment is present in an amount of about 10 wt. % to about 60 wt. % based on the total weight of the dye or pigment and clay. In certain other embodiments, the dye or pigment is present in an amount of about 15 wt. % to about 45 wt. % based on the total weight of the dye or pigment and clay. In certain embodiments, the dye or pigment is present in an amount of about 20 wt. % to about 30 wt. % based on the total weight of the dye or pigment and clay.

In certain embodiments of the present disclosure, a method of forming a hybrid pigment is provided comprising the steps of providing a dye or pigment selected from the group consisting of perinones, diphenylmethanes, acridines, xanthenes, triarylmethanes, thiazines, indophenols, indulines, nigrosines, aminoazobenzenes, anilines, monoazos, benzimidazoles, diazos, phthalocyanines, quinacridones, metal complexes, azo/metal complexes, and mixtures thereof; and mixing the dye or pigment with a fibrous clay. In certain embodiments, the dye or pigment and fibrous clay are heated to react the dye or pigment with the fibrous clay. In certain embodiments, the dye or pigment and fibrous clay are heated to a temperature of about 90° C. to about 350° C. for about 10 minutes to about 24 hours. The dye or pigment and fibrous clay can be ground after mixing them together.

In certain embodiments of the present disclosure, a method of forming a hybrid pigment is provided comprising the steps of providing a dye or pigment selected from the group consisting of Solvent Orange 3, Solvent Orange 5, Solvent Orange 6, Solvent Orange 15, Solvent Orange 60, Solvent Yellow 2, Solvent Yellow 14, Solvent Yellow 21, Solvent Yellow 32, Solvent Yellow 34, Solvent Yellow 45, Solvent Yellow 114, Solvent Red 23, Solvent Red 24, Solvent Red 35, Solvent Red 41, Solvent Red 49, Solvent Red 135, Solvent Green 1, Solvent Violet 8, Solvent Blue 3, Solvent Blue 4, Solvent Blue 7, Solvent Blue 8, Solvent Blue 22, Solvent Black 5, Solvent Black 7, Solvent Brown 43, Pigment Orange 64, Pigment Red 57:1, Pigment Red 242, Pigment Yellow 138, Pigment Yellow 154, Pigment Yellow 180, Pigment Yellow 181, Pigment Yellow 191, Pigment Yellow 214, Pigment Blue 15:3, Pigment Violet 19, Disperse Red 277, D&C Yellow Y7, D&C Red 30, D&C Red 30 Talc LK, D&C Violet V2, D&C Red 36, D&C Yellow 10, Yellow LC124, Disperse Yellow 54, and mixtures thereof; and a fibrous clay. In certain embodiments, the dye or pigment and fibrous clay are heated to react the dye or pigment with the fibrous clay. The dye or pigment and fibrous clay can be heated to a temperature of about 90° C. to about 350° C. for about 10 minutes to about 24 hours. In certain embodiments, the dye or pigment and fibrous clay are ground after mixing them together.

DETAILED DESCRIPTION

Figure 1:
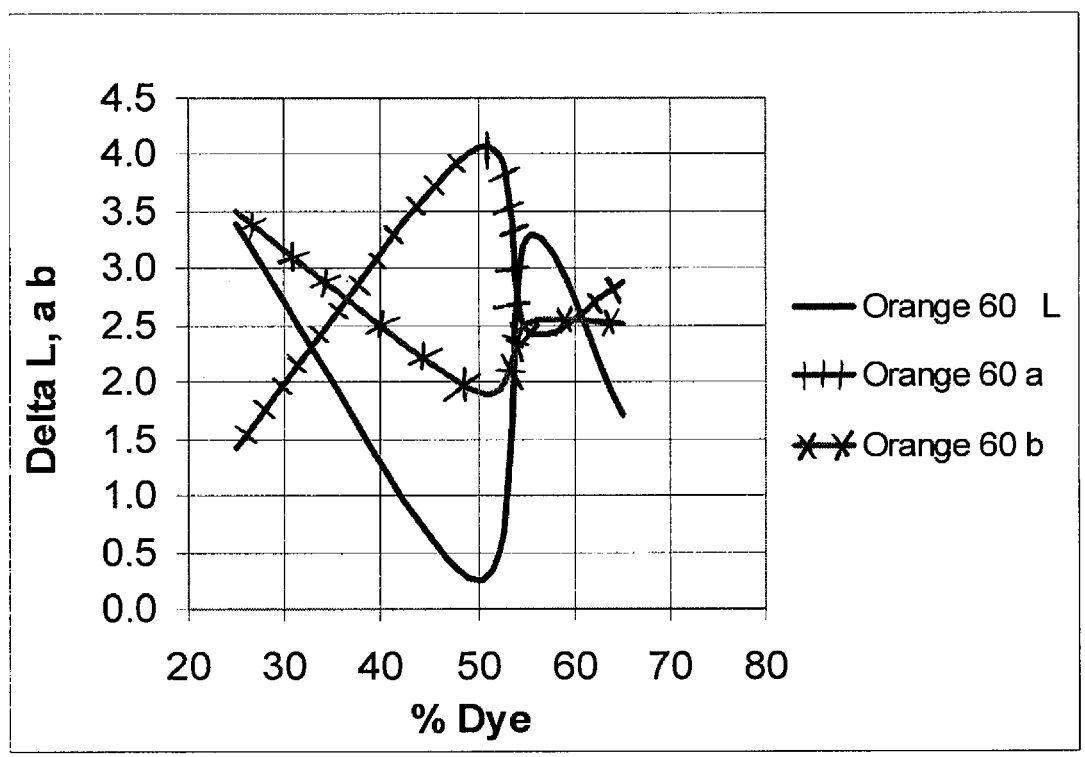
FIG. 1 illustrates color shifts using various concentrations of Solvent Orange 60 reacted with palygorskite clay.

In certain embodiments of the present disclosure, a hybrid pigment composition is provided. The hybrid pigment composition comprises a dye or pigment selected from the group consisting of perinones, diphenylmethanes, acridines, xanthenes, triarylmethanes, thiazines, indophenols, indulines, nigrosines, aminoazobenzenes, anilines, monoazos, benzimidazoles, diazos, phthalocyanines, quinacridones, metal complexes, azo/metal complexes, and mixtures thereof; and a fibrous clay. In certain embodiments, the fibrous clay is selected from palygorskite, sepiolite, and mixtures thereof. In certain embodiments, the dye or pigment and fibrous clay are heated to react the dye or pigment with the fibrous clay.

In certain embodiments of the present disclosure, the dye or pigment is present in an amount of about 1 wt. % to about 90 wt. % based on the total weight of the dye or pigment and clay. In certain embodiments, the dye or pigment is present in an amount of about 10 wt. % to about 60 wt. % of based on the total weight of the dye or pigment and clay. In certain embodiments, the dye or pigment is present in an amount of about 15 wt. % to about 45 wt. % based on the total weight of the dye or pigment and clay. In certain embodiments, the dye or pigment is present in an amount of 20 wt. % to about 30 wt. % based on the total weight of the dye or pigment.

In certain embodiments of the present disclosure, a hybrid pigment composition is provided comprising a dye selected from the group consisting of Solvent Orange 3, Solvent Orange 5, Solvent Orange 6, Solvent Orange 15, Solvent Orange 60, Solvent Yellow 2, Solvent Yellow 14, Solvent Yellow 21, Solvent Yellow 32, Solvent Yellow 34, Solvent Yellow 45, Solvent Yellow 114, Solvent Red 23, Solvent Red 24, Solvent Red 35, Solvent Red 41, Solvent Red 49, Solvent Red 135, Solvent Green 1, Solvent Violet 8, Solvent Blue 3, Solvent Blue 4, Solvent Blue 7, Solvent Blue 8, Solvent Blue 22, Solvent Black 5, Solvent Black 7, Solvent Brown 43, Pigment Orange 64, Pigment Red 57:1, Pigment Red 242, Pigment Yellow 138, Pigment Yellow 154, Pigment Yellow 180, Pigment Yellow 181, Pigment Yellow 191, Pigment Yellow 214, Pigment Blue 15:3, Pigment Violet 19, Disperse Red 277, D&C Yellow Y7, D&C Red 30, D&C Red 30 Talc LK, D&C Violet V2, D&C Red 36, D&C Yellow 10, Yellow LC124, Disperse Yellow 54, and mixtures thereof; and a fibrous clay. In certain embodiments, the fibrous clay is selected from palygorskite, sepiolite, and mixtures thereof. In certain embodiments, the dye or pigment and fibrous clay are heated to react the dye or pigment with the fibrous clay. The dye or pigment can be present in an amount of about 1 wt. % to about 90 wt. % based on the total weight of the dye or pigment and clay. In certain embodiments, the dye or pigment is present in an amount of about 10 wt. % to about 60 wt. % based on the total weight of the dye or pigment and clay. In certain other embodiments, the dye or pigment is present in an amount of about 15 wt. % to about 45 wt. % based on the total weight of the dye or pigment and clay. In certain embodiments, the dye or pigment is present in an amount of 20 wt. % to about 30 wt. % based on the total weight of the dye or pigment.

In certain embodiments of the present disclosure, a method of forming a hybrid pigment is provided comprising the steps of providing a dye or pigment selected from the group consisting of perinones, diphenylmethanes, acridines, xanthenes, triarylmethanes, thiazines, indophenols, indulines, nigrosines, aminoazobenzenes, anilines, monoazos, benzimidazoles, diazos, phthalocyanines, quinacridones, metal complexes, azo/metal complexes, and mixtures thereof; and mixing the dye or pigment with a fibrous clay. In certain embodiments, the dye or pigment and fibrous clay are heated to react the dye or pigment with the fibrous clay. In certain embodiments, the dye or pigment and fibrous clay are heated to a temperature of about 90° C. to about 350° C. for about 10 minutes to about 24 hours. In certain embodiments, the dye or pigment and fibrous clay are heated to a temperature of about 120° C. to about 250° C. In certain embodiments, the dye or pigment and the clay are heated for about 1 hour to about 9 hours. The dye or pigment and fibrous clay can be ground after mixing them together.

In certain embodiments of the present disclosure, a method of forming a hybrid pigment is provided comprising the steps of providing a dye or pigment selected from the group consisting of Solvent Orange 3, Solvent Orange 5, Solvent Orange 6, Solvent Orange 15, Solvent Orange 60, Solvent Yellow 2, Solvent Yellow 14, Solvent Yellow 21, Solvent Yellow 32, Solvent Yellow 34, Solvent Yellow 45, Solvent Yellow 114, Solvent Red 23, Solvent Red 24, Solvent Red 35, Solvent Red 41, Solvent Red 49, Solvent Red 135, Solvent Green 1, Solvent Violet 8, Solvent Blue 3, Solvent Blue 4, Solvent Blue 7, Solvent Blue 8, Solvent Blue 22, Solvent Black 5, Solvent Black 7, Solvent Brown 43, Pigment Orange 64, Pigment Red 57:1, Pigment Red 242, Pigment Yellow 138, Pigment Yellow 154, Pigment Yellow 180, Pigment Yellow 181, Pigment Yellow 191, Pigment Yellow 214, Pigment Blue 15:3, Pigment Violet 19, Disperse Red 277, D&C Yellow Y7, D&C Red 30, D&C Red 30 Talc LK, D&C Violet V2, D&C Red 36, D&C Yellow 10, Yellow LC124, Disperse Yellow 54, and mixtures thereof; and a fibrous clay. In certain embodiments, the dye or pigment and fibrous clay are heated to react the dye or pigment and the fibrous clay. The dye or pigment and fibrous clay can be heated to a temperature of about 90° C. to about 350° C. for about 10 minutes to about 24 hours. In certain embodiments, the dye or pigment and fibrous clay are heated to a temperature of about 120° C. to about 250° C. In certain embodiments, the dye or pigment and the clay are heated for about 1 hour to about 9 hours. In certain embodiments, the dye or pigment and fibrous clay are ground after mixing them together.

Samples were prepared by either blending or grinding together a dye or pigment with a fibrous clay such as palygorskite or sepiolite clay. The samples can be ground by any conventional means, including a coffee grinder and a blender. In certain embodiments of the present disclosure, the dye or pigment was mixed with clays of different particle sizes and surface areas.

Once prepared, the samples were heated in the temperature range of 90° C. to 350° C. using a laboratory oven or a rotary mixer connected to a hot oil heater to heat the mixer jacket.

It has been determined that while many chemical classes of solvent dyes and disperse dyes or pigments can be successfully reacted with the fibrous clays and result in the formation of a hybrid pigment that exhibits enhanced physical and chemical properties. A color shift may indicate a stronger bond formation between the clay surface and the solvent dye.

When a dye or pigment is reacted with either palygorskite clay or sepiolite clay, the extent of the color shift is primarily dependent upon the ratio of the concentration of the solvent dye to clay. For example, a solvent dye reacted at a 25 wt. % concentration with 75 wt. % clay yields one color, while 50 wt. %, 55 wt. %, or even 75 wt. % solvent dye concentrations based on the total weight of the solvent dye and the clay each yield different colors. However, the color shift is unexpectedly not linear.

Table 1 illustrates solvent dyes included within the scope of the present disclosure that can react with fibrous clays

TABLE 1

| Chemical Class | Generic Name | CI Number |
| --- | --- | --- |
| Quinophthalone | Solvent Yellow 114 | 47020 |
| Perinone | Solvent Orange 60 | 564100 |
| Diphenylmethane | Solvent Yellow 34 | 41000 |
| Acridine | Solvent Orange 15 | 46005 |
| Xanthene | Solvent Red 49 | 45170 |
| Triarylmethane | Solvent Red 41 | 42510 |
| Triarylmethane | Solvent Violet 8 | 42535 |
| Triarylmethane | Solvent Blue 3 | 42775 |
| Triarylmethane | Solvent Blue 4 | 44045 |
| Triarylmethane | Solvent Green 1 | 42000 |
| Thiazine | Solvent Blue 8 | 52015 |
| Indophenol | Solvent Blue 22 | 49705 |

TABLE 1-continued

| Chemical Class | Generic Name | CI Number |
| --- | --- | --- |
| Induline | Solvent Blue 7 | 50400 |
| Nigrosine | Solvent Black 5 | 50415 |
| Nigrosine | Solvent Black 7 | 50415 |
| Aniline | Solvent Yellow 14 | 12055 |
| Aniline | Solvent Orange 3 | 11270 |
| Aminoazobenzene | Solvent Yellow 2 | 11020 |
| Aminoazobenzene | Solvent Red 23 | 26100 |
| Aminoazobenzene | Solvent Red 24 | 26105 |
| Metal complex | Solvent Yellow 32 | 48045 |
| Metal complex | Solvent Yellow 21 | 18690 |
| Metal complex | Solvent Yellow 45 | 11700 |
| Metal complex | Solvent Orange 5 | 18745:1 |
| Metal complex | Solvent Orange 6 | 187636:1 |
| Metal complex | Solvent Red 35 | 16260 + 45170 |
| Azo/Metal complex | Solvent Brown 43 | CAS# 61116-28-7 |
| Aminoketone | Solvent Red 135 | 564120 |
| Aminoketone | Solvent Yellow 43 | 561930 |

Several solvent dyes were disclosed in a copending application, U.S. application Ser. No. 12/068,115, at up to a nominal 50 wt. % solvent dye loading based on the total weight of the solvent dye and clay. However, recent discoveries and data show that color shifts and properties of the solvent dye-clay hybrid pigments is non-linear in nature. Therefore, it is not, a priori, possible to predict in advance how a particular solvent dye-clay pigment hybrid will respond in a particular manner. As such, unexpected improvements have been discovered in certain embodiments of the present disclosure comprising solvent dye loadings of greater than 50 wt. %.

The color shift of hybrid pigments was determined. L*, a*, b* values were taken of each sample prior to and after heating. The delta E was calculated between the unheated sample and the heated sample. CIE L*a*b* (CIELAB) is a color model used conventionally to describe all the colors visible to the human eye. The three basic coordinates represent the lightness and color being measured, L* is related to lightness (L*=0 yields black and L*=100 indicates white), a* measures red and green hue (a*=negative values indicates green and a*=positive values indicates red), and b* measures yellow and blue hue (b*=negative values indicates blue and b*=positive values indicates yellow). The relative perceptual differences between any two colors in L*a*b* can be approximated by taking the Euclidean distance, delta E, between them. The delta E is given as a numerical value and can be used to measure a change in color. The larger the delta E, the larger the color change. Generally, color shifts with a delta E of about 1 or greater are discernable to the human eye.

EXAMPLES

Solvent dye was reacted with either palygorskite or sepiolite clay at various concentrations, as well as at concentrations of up to 65 wt. %. The accompanying data depict the color shifts of the hybrid pigment at various reaction ratios and how the results are indicative of a non-linear progression of color development as a function of concentration. Table 2 and FIG. 1, show color shifts using various concentrations of Solvent Orange 60 reacted with palygorskite clay. As shown in FIG. 1, there is a non-linear color development of the hybrid pigment formed between Solvent Orange 60 and palygorskite clay.

TABLE 2

| wt. % Solvent Orange 60 | Before heating | | | After heating | | | Differences from 25% after heating | | | |
|---|---|---|---|---|---|---|---|---|---|---|
| | L | a | b | L | a | b | L | a | b | Delta E |
| 25 | 59.1 | 41.7 | 31.3 | 55.7 | 40.3 | 34.7 | 0.0 | 0.0 | 0.0 | 0.00 |
| 50 | 54.9 | 46.4 | 36.0 | 54.6 | 42.4 | 34.1 | −1.1 | 2.1 | −0.7 | 2.44 |
| 55 | 59.1 | 47.1 | 38.9 | 55.8 | 44.7 | 36.4 | 0.1 | 4.4 | 1.7 | 4.71 |
| 65 | 58.9 | 48.8 | 40.6 | 57.1 | 46.0 | 38.0 | 1.4 | 5.7 | 3.3 | 6.73 |

| wt. % Solvent Orange 60 | Before heating | | | After heating | | | Differences before and after heating | | | |
|---|---|---|---|---|---|---|---|---|---|---|
| | L | a | b | L | a | b | LH-LB | aH-aB | bH-bB | Delta E |
| 25 | 59.1 | 41.7 | 31.3 | 55.7 | 40.3 | 34.7 | 3.4 | 1.4 | 3.5 | 5.06 |
| 50 | 54.9 | 46.4 | 36.0 | 54.6 | 42.4 | 34.1 | 0.3 | 4.1 | 1.9 | 4.51 |
| 55 | 59.1 | 47.1 | 38.9 | 55.8 | 44.7 | 36.4 | 3.3 | 2.5 | 2.5 | 4.81 |
| 65 | 58.9 | 48.8 | 40.6 | 57.1 | 46.0 | 38.0 | 1.7 | 2.9 | 2.5 | 4.19 |

At lower concentrations, such as 10 wt. % up to 50 wt. % solvent dye reacted with the clay, the delta E measured of the mixture increases sharply relative to the solvent dye alone. At concentrations of greater than 50%, there is less color shift.

Differential Scanning calorimetry (DSC) was used as an analytical method for determining thermal stability differences between pure Solvent Yellow 114 dye and Solvent Yellow 114 dye blended at various concentrations with palygorskite or sepiolite. Samples were analyzed prior to and after heat treating the mixture. The melting point of the material (either Solvent Yellow 114 alone or mixed with clay) was determined by calculating the enthalpy ($\Delta H$) of the DSC peak and this data is shown in Table 3. For pure Solvent Yellow 114, the $\Delta H$ is 41.9 mJ/mg. For samples of Solvent Yellow 114 mixed with either palygorskite clay or sepiolite at 25 wt. %-75 wt. % loadings based on the total weight of the solvent dye and clay, the enthalpy ($\Delta H$) ranges from −37.8 mJ/mg up to only 26.5 mJ/mg, indicating that the thermal stability of the Solvent Yellow 114 dye is enhanced once it is mixed with palygorskite or sepiolite clay. Also, the enthalpies do not change linearly relative to the percentage of dye (25 wt. %-75 wt. %) reacted with the clay. In Table 3, M325 is milled MinTech 325A grade palygorskite and MSepiolite is milled sepiolite.

TABLE 3

| Dye | wt. % Dye | Clay | Time: 9 hr Temp: 170° C. | Heat/ Unheated | Enthalpy: $\Delta H$, mJ/mg |
|---|---|---|---|---|---|
| Yellow 114 | 100 | None | Lab oven | Unheated | 41.9 |
| Yellow 114 | 25 | M325A | Lab oven | Unheated | −31.3 |
| Yellow 114 | 25 | M325A | Lab oven | Heated | −37.8 |
| Yellow 114 | 50 | M325A | Lab oven | Unheated | 14.7 |
| Yellow 114 | 50 | M325A | Lab oven | Heated | 13.2 |
| Yellow 114 | 50 | MSepiolite | Lab oven | Heated | 14.5 |
| Yellow 114 | 75 | M325A | Lab oven | Unheated | 26.5 |
| Yellow 114 | 75 | M325A | Lab oven | Heated | 26.5 |

Figure 2:
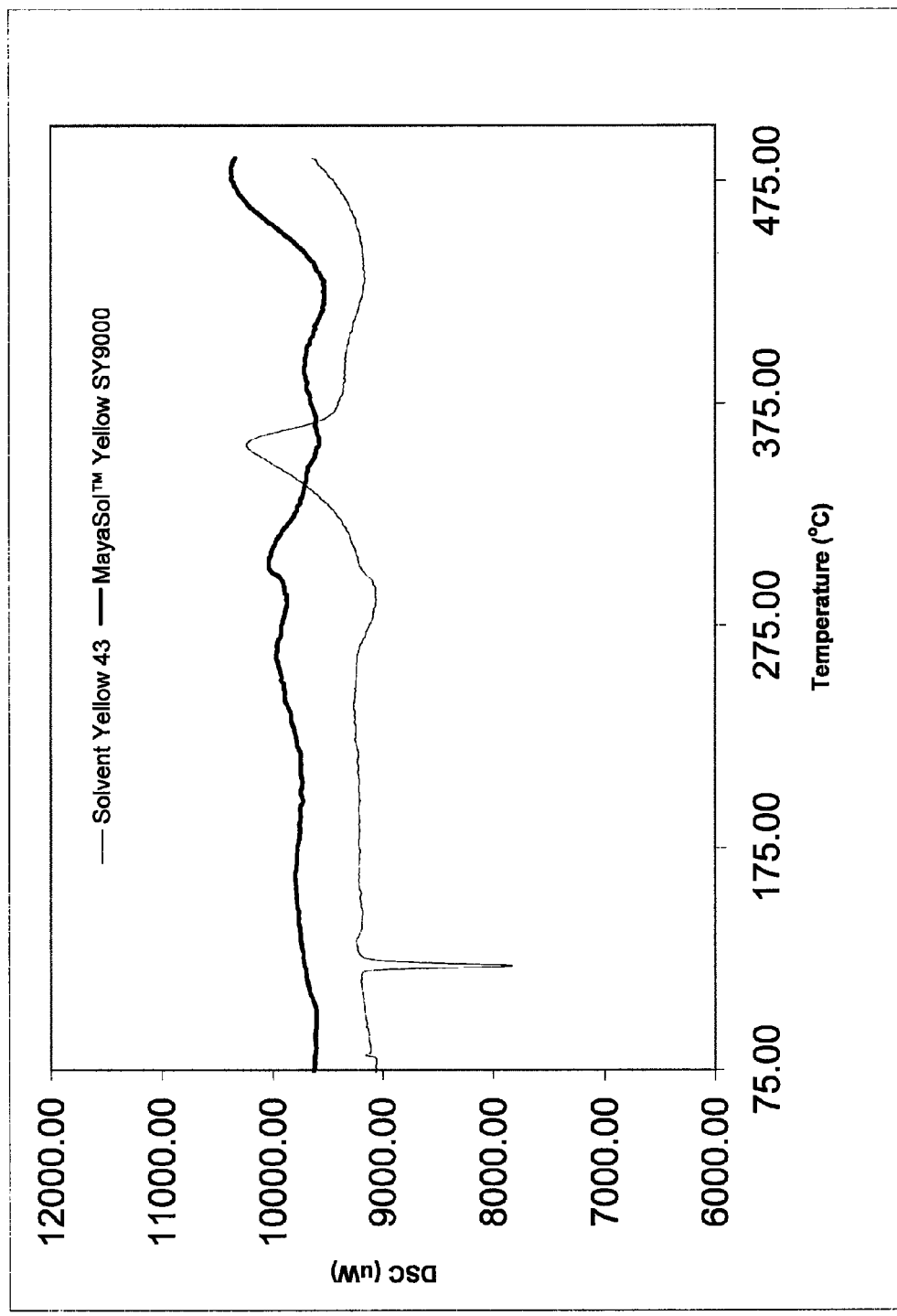
FIG. 2 illustrates DSC data showing the effect of the reaction of Solvent Yellow 43 with palygorskite clay.

Mayan Pigment's MayaSol™ Yellow SY9000 is a hybrid pigment according the present disclosure, and is a reaction product of Solvent Yellow 43 and palygorskite. DSC data was obtained for Solvent Yellow 43 and the MayaSol™ Yellow SY9000. As shown in FIG. 2, the absence of endotherms and exotherms in the MayaSol™ Yellow SY9000 sample, as compared to Solvent Yellow 43, demonstrates the enhanced stability of the hybrid pigment over the dye alone.

Additional samples of solvent dye and palygorskite clay were prepared. The solvent dyes were mixed with palygorskite clay in a 20/80 solvent dye/clay wt. % ratio based on the total weight of the composition. L*, a*, b* values were taken of each sample prior to and after heating for one hour at 150° C. in a laboratory oven. The color shift of the hybrid pigments are shown in Table 4.

TABLE 4

| Sample | Heat Treatment | L* | a* | b* | $\Delta E$ |
|---|---|---|---|---|---|
| Solvent Yellow 163 | No Heat | 68.78 | 26.39 | 39.98 | |
| | Heated 1 hr@150° C. | 54.81 | 27.72 | 32.25 | 16.02 |
| Solvent Yellow 21 | No Heat | 60.27 | 16.97 | 35.95 | |
| | Heated 1 hr@150° C. | 58.90 | 16.58 | 34.12 | 2.32 |
| Solvent Brown 43 | No Heat | 46.22 | 6.77 | 5.23 | |
| | Heated 1 hr@150° C. | 44.99 | 5.07 | 6.63 | 2.52 |
| Solvent Red 135 | No Heat | 53.61 | 31.13 | 19.37 | |
| | Heated 1 hr@150° C. | 41.37 | 20.72 | 7.05 | 20.25 |

Samples of disperse dyes and clay were also prepared according to the present disclosure. 20 wt. % disperse dye was mixed with 80 wt. % palygorskite clay based on the total weight of the disperse dye and clay. The samples were prepared using a coffee grinder to grind the pigment/dye with clay and ground samples were heated in a static oven at 150° C. for about 1 hour. The L*a*b* was taken of each sample prior to and after heating and the delta E was determined. The results are shown in the Table 5

TABLE 5

| Sample | Heated/ Unheated | L* | a* | b* | $\Delta E$ |
|---|---|---|---|---|---|
| Disperse Red 277 | Unheated | 53.65 | 26.22 | 4.67 | |
| | Heated | 39.14 | 25.13 | 6.59 | 14.70 |
| D&C Yellow Y7 | Unheated | 56.39 | 34.58 | 27.24 | |
| | Heated | 56.77 | 34.35 | 36.04 | 8.81 |
| D&C Red 30 | Unheated | 51.05 | 40.65 | 14.56 | |
| | Heated | 45.01 | 35.50 | 7.36 | 10.72 |
| D&C Red 30 Talc LK | Unheated | 58.17 | 39.20 | 8.55 | |
| | Heated | 46.18 | 33.57 | 0.18 | 15.67 |
| D&C Violet V2 | Unheated | 55.36 | 0.74 | −12.80 | |
| | Heated | 35.17 | 4.99 | −17.11 | 21.08 |
| D&C Red 36 | Unheated | 56.30 | 43.42 | 27.53 | |
| | Heated | 51.03 | 43.68 | 30.66 | 6.13 |
| D&C Yellow 10 | Unheated | 85.55 | −7.58 | 64.69 | |
| | Heated | 84.35 | −6.12 | 67.45 | 3.35 |

TABLE 5-continued

| Sample | Heated/Unheated | L* | a* | b* | ΔE |
|---|---|---|---|---|---|
| Yellow LC124 | Unheated | 85.87 | −9.96 | 56.65 | |
| | Heated | 85.10 | −8.09 | 66.47 | 10.03 |
| Disperse Yellow 54 | Unheated | 69.50 | 18.40 | 38.30 | |
| | Heated | 66.28 | 18.90 | 53.09 | 15.14 |

Samples of disperse pigments and clay were prepared according to the present disclosure. 25 wt. % pigment was mixed with 75 wt. % palygorskite based on the total weight of the disperse dye and clay. The samples were prepared using a coffee grinder to grind the pigment/dye with clay and ground samples were heated in a static oven at 150. The L*a*b* was taken of each sample prior to and after heating and the delta E was determined. The results are shown in Table 6.

TABLE 6

| PIGMENT (25 wt. %) + PALYGORSKITE (75 wt. %) | | L* | a* | b* | ΔE |
|---|---|---|---|---|---|
| Pigment Orange 64 | Before Heat | 64.98 | 39.07 | 37.80 | 2.14 |
| | After Heat | 63.06 | 40.00 | 38.00 | |
| Pigment Red 57:1 | Before Heat | 60.71 | 15.02 | −2.20 | 2.73 |
| | After Heat | 59.68 | 12.83 | −0.94 | |
| Pigment Yellow 180 | Before Heat | 81.39 | 2.70 | 63.82 | 6.09 |
| | After Heat | 77.51 | 2.25 | 59.15 | |
| Pigment Yellow 181 | Before Heat | 78.25 | 13.20 | 60.26 | 10.04 |
| | After Heat | 77.66 | 3.22 | 61.23 | |
| Pigment Yellow 191 | Before Heat | 74.93 | 19.98 | 50.73 | 2.05 |
| | After Heat | 74.09 | 21.63 | 51.62 | |
| Pigment Yellow 154 | Before Heat | 83.49 | −1.24 | 60.18 | 3.07 |
| | After Heat | 82.53 | 0.22 | 62.70 | |
| Pigment Yellow 138 | Before Heat | 83.81 | −4.83 | 69.34 | 1.31 |
| | After Heat | 82.95 | −4.43 | 68.44 | |
| Pigment Red 242 | Before Heat | 55.14 | 46.92 | 31.07 | 0.65 |
| | After Heat | 54.80 | 46.39 | 31.25 | |
| Pigment Blue 15:3 | Before Heat | 81.21 | −1.27 | 1.25 | 1.86 |
| | After Heat | 81.48 | −1.19 | 3.09 | |
| Pigment Violet 19 | Before Heat | 51.22 | 45.85 | 7.02 | 1.37 |
| | After Heat | 50.26 | 45.57 | 6.08 | |
| Pigment Yellow 214 | Before Heat | 83.49 | −1.24 | 60.18 | 3.07 |
| | After Heat | 82.53 | 0.22 | 62.70 | |

Thus, as shown in the data Tables 2-6, stable hybrid pigments are formed from solvent dyes and disperse dyes and pigments according to the present disclosure.

The embodiments illustrated in the instant disclosure are for illustrative purposes only. They should not be construed to limit the claims. As is clear to one of ordinary skill in the art, the instant disclosure encompasses a wide variety of embodiments not specifically illustrated herein. While the compositions and methods of this disclosure have been described in terms of exemplary embodiments, it will be apparent to those of skill in the art that variations may be applied to the compositions and methods and in the steps or in the sequence of steps of the method described herein without departing from the concept, spirit and scope of the invention.

What is claimed is:

1. A hybrid pigment composition comprising:
a dye or pigment selected from the group consisting of perinones, diphenylmethanes, acridines, xanthenes, triarylmethanes, indophenols, indulines, nigrosines, aminoazobenzenes, anilines, monoazos, benzimidazoles, diazos, phthalocyanines, quinacridones, metal complexes, azo/metal complexes, and mixtures thereof; and
a fibrous clay.

2. The hybrid pigment composition of claim 1, wherein the fibrous clay is selected from palygorskite, sepiolite, and mixtures thereof.

3. The hybrid pigment composition of claim 1, wherein the dye or pigment and fibrous clay are heated to react the dye or pigment with the fibrous clay.

4. The hybrid pigment composition of claim 1, wherein the dye or pigment is present in an amount of about 1 wt. % to about 90 wt. % based on the total weight of the dye or pigment and clay.

5. The hybrid pigment composition of claim 4, wherein the dye or pigment is present in an amount of about 10 wt. % to about 60 wt % based on the total weight of the dye or pigment and clay.

6. The hybrid pigment composition of claim 5, wherein the dye or pigment is present in an amount of about 15 wt. % to about 45 wt % based on the total weight of the dye or pigment and clay.

7. A hybrid pigment composition comprising:
a dye or pigment selected from the group consisting of Solvent Orange 3, Solvent Orange 5, Solvent Orange 6, Solvent Orange 15, Solvent Orange 60, Solvent Yellow 2, Solvent Yellow 14, Solvent Yellow 21, Solvent Yellow 32, Solvent Yellow 34, Solvent Yellow 45, Solvent Yellow 114, Solvent Red 23, Solvent Red 24, Solvent Red 35, Solvent Red 41, Solvent Red 49, Solvent Red 135, Solvent Green 1, Solvent Violet 8, Solvent Blue 3, Solvent Blue 4, Solvent Blue 7, Solvent Blue 22, Solvent Black 5, Solvent Black 7, Solvent Brown 43, Pigment Orange 64, Pigment Red 57:1, Pigment Red 242, Pigment Yellow 138, Pigment Yellow 154, Pigment Yellow 180, Pigment Yellow 181, Pigment Yellow 191, Pigment Yellow 214, Pigment Blue 15:3, Pigment Violet 19, Disperse Red 277, D&C Yellow Y7, D&C Red 30, D&C Red 30 Talc LK, D&C Violet V2, D&C Red 36, D&C Yellow 10, Yellow LC124, Disperse Yellow 54, and mixtures thereof; and
a fibrous clay.

8. The hybrid pigment composition of claim 7, wherein the fibrous clay is selected from palygorskite, sepiolite, and mixtures thereof.

9. The hybrid pigment composition of claim 7, wherein the dye or pigment and fibrous clay are heated to react the dye or pigment with the fibrous clay.

10. The hybrid pigment composition of claim 7, wherein the dye or pigment is present in an amount of about 1 wt. % to about 90 wt. % based on the total weight of the dye or pigment and clay.

11. The hybrid pigment composition of claim 10, wherein the dye or pigment is present in an amount of about 10 wt. % to about 60 wt. % based on the total weight of the dye or pigment and clay.

12. The hybrid pigment composition of claim 11, wherein the dye or pigment is present in an amount of about 15 wt. % to about 45 wt % based on the total weight of the dye or pigment and clay.

13. A method of forming a hybrid pigment comprising the steps of:
providing a dye or pigment selected from the group consisting of perinones, diphenylmethanes, acridines, xanthenes, triarylmethanes, indophenols, indulines, nigrosines, aminoazobenzenes, anilines, monoazos, benzimidazoles, diazos, phthalocyanines, quinacridones, metal complexes, azo/metal complexes, and mixtures thereof; and
mixing the dye or pigment with a fibrous clay.

14. The method according to claim 13, further comprising heating the dye or pigment and fibrous clay to react the dye or pigment and the fibrous clay.

15. The method according to claim 14, wherein the dye or pigment and fibrous clay are heated to a temperature of about 90° C. to about 350° C. for about 10 minutes to about 24 hours.

16. The method according to claim 13, further comprising grinding the dye or pigment and fibrous clay after mixing them together.

17. A method of forming a hybrid pigment comprising the steps of:

providing a dye or pigment selected from the group consisting of Solvent Orange 3, Solvent Orange 5, Solvent Orange 6, Solvent Orange 15, Solvent Orange 60, Solvent Yellow 2, Solvent Yellow 14, Solvent Yellow 21, Solvent Yellow 32, Solvent Yellow 34, Solvent Yellow 45, Solvent Yellow 114, Solvent Red 23, Solvent Red 24, Solvent Red 35, Solvent Red 41, Solvent Red 49, Solvent Red 135, Solvent Green 1, Solvent Violet 8, Solvent Blue 3, Solvent Blue 4, Solvent Blue 7, Solvent Blue 22, Solvent Black 5, Solvent Black 7, Solvent Brown 43, Pigment Orange 64, Pigment Red 57:1, Pigment Red 242, Pigment Yellow 138, Pigment Yellow 154, Pigment Yellow 180, Pigment Yellow 181, Pigment Yellow 191, Pigment Yellow 214, Pigment Blue 15:3, Pigment Violet 19, Disperse Red 277, D&C Yellow Y7, D&C Red 30, D&C Red 30 Talc LK, D&C Violet V2, D&C Red 36, D&C Yellow 10, Yellow LC124, Disperse Yellow 54, and mixtures thereof; and mixing the dye or pigment with a fibrous clay.

18. The method according to claim 17, further comprising heating the dye or pigment and fibrous clay to react the dye or pigment and the fibrous clay.

19. The method according to claim 18, wherein the dye or pigment and fibrous clay are heated to a temperature of about 90° C. to about 350° C. for about 10 minutes to about 24 hours.

20. The method according to claim 17, further comprising grinding the dye or pigment and fibrous clay after mixing them together.

* * * * *